United States Patent
Kerr

Patent Number: 5,908,276
Date of Patent: Jun. 1, 1999

[54] ANNULAR ENGAGEMENT LOCK NUT

[75] Inventor: Jack R. Kerr, DeSoto, Tex.

[73] Assignee: Lok-Mor, Inc., Arlington, Tex.

[21] Appl. No.: 08/790,529

[22] Filed: Jan. 29, 1997

[51] Int. Cl.⁶ .......................... F16B 39/22; F16B 39/30
[52] U.S. Cl. .................. 411/307; 411/285; 411/937.1
[58] Field of Search ........................ 411/263, 307, 411/285, 287, 937.1

[56] References Cited

U.S. PATENT DOCUMENTS

| | | |
|---|---|---|
| 952,507 | 3/1910 | Burns . |
| 1,101,501 | 6/1914 | Ward ........................................ 411/285 |
| 1,369,156 | 2/1921 | Woodward ............................... 411/307 |
| 1,406,065 | 2/1922 | Norwood ................................. 411/285 |
| 1,922,689 | 8/1933 | Linnenbruegge .................... 411/307 X |
| 2,285,080 | 6/1942 | Berge . |
| 2,990,866 | 7/1961 | Macy et al. . |
| 3,001,567 | 9/1961 | Brill . |
| 3,004,574 | 10/1961 | Flick et al. . |
| 3,265,107 | 8/1966 | Glicksman . |
| 3,316,952 | 5/1967 | Hollinger . |
| 3,494,399 | 2/1970 | Heighberger . |
| 4,004,626 | 1/1977 | Biblin et al. . |
| 4,069,854 | 1/1978 | Heighberger . |
| 4,266,590 | 5/1981 | McKewan ................................ 411/307 |
| 4,682,924 | 7/1987 | Kerr et al. .............................. 411/329 |
| 4,692,077 | 9/1987 | Kerr et al. .............................. 411/206 |
| 4,854,794 | 8/1989 | Oertel ...................................... 411/307 |

Primary Examiner—Neill R. Wilson
Attorney, Agent, or Firm—Daniel Rubin

[57] ABSTRACT

A prevailing torque type lock nut for assembly onto a threaded bolt that affords a substantially 360 degree break loose torque engagement resistance against the standard bolt threads and is comprised of a compressively controlled height reduction as compared to a standard nut of like size.

8 Claims, 1 Drawing Sheet

U.S. Patent      Jun. 1, 1999      5,908,276
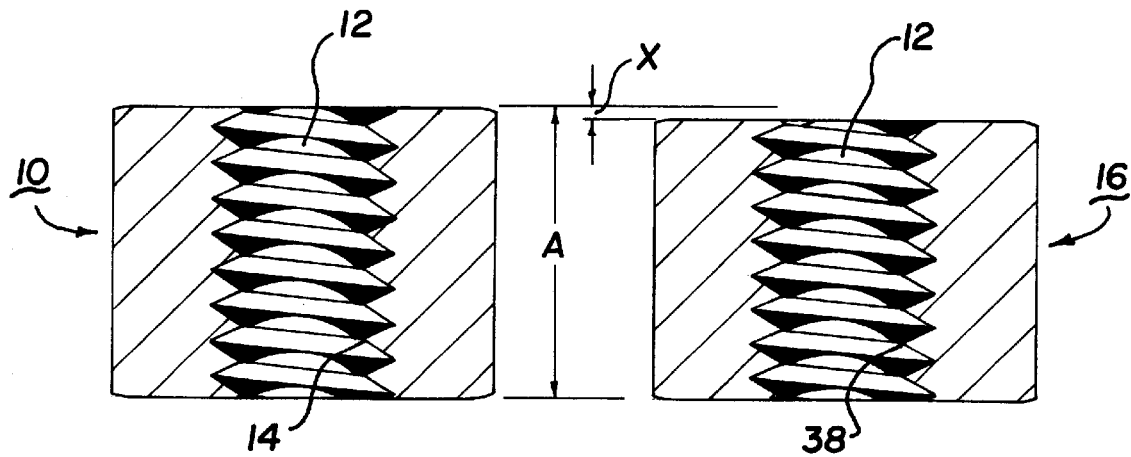
Fig. 1
(PRIOR ART)
Fig. 2
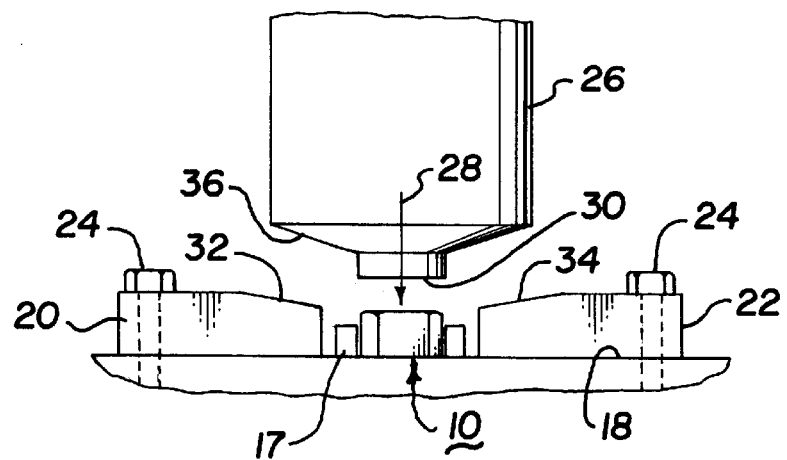
Fig. 3

ANNULAR ENGAGEMENT LOCK NUT

FIELD OF THE INVENTION

The field of art to which the invention relates comprises lock nut fasteners utilized to resist loosening from fastener bolts on which the nuts are mounted.

BACKGROUND OF THE INVENTION

Nut fasteners forming threaded joints with bolts on which they are assembled are subject to dynamic loads, stress reversals, shock, vibration and radical atmospheric fluctuations rendering them susceptible to undersireable loosening. When the joint design permits tightening of the nut fastener to high preload levels, the chances of nut loosening in service are significantly reduced. However, in many applications, the joint makeup, e.g. interposition of a soft gasket, accessory, etc. between the bolt and nut is such that preload alone is inadequate and an assisting anti-loosening measure must be employed in order to maintain an installation standard. One such measure is the use of lock type fasteners.

Lock type fasteners in general comprise a broad family of mechanical fasteners each having a design capability to resist loosening after the fastener is assembled in its service application. They encompass both externally and internally threaded parts and are available commercially in a variety of different constructions.

Generally, lock type fasteners are characterized as falling into one of three basic categories, namely "free running", "prevailing torque" and "chemical reaction". The "free running" lock type nut fastener assembles freely until seated. It then gains resistance to loosening through the presence of an accessory device or through development of a tensile load in the externally threaded component as a result of tightening. The "prevailing torque" nut fastener typically has a self contained feature that creates frictional interference between the threads of the mating components. Finally, the "chemical reaction" fastener tends to adhesively bond-mating threads through the application and reaction of chemicals deposited on or about the threads. They are primarily suited to applications intended to be permanent in that they have little, if any, re-use potential. Official regulation of the fastener nut industry is governed by the Industrial Fastener Institute (IFI) standard 100/107 or ANSI/ASMIE standard B18.2.2.

The common design principal of all lock type fasteners is to increase the break loose torque resistance between the nut and bolt. The Inalor disadvantage of the free runninig type nut is that, when they break loose, resistance is overcome either through loss of fastener preload or ineffectiveness of the accessory device. Re-use resistance to fastener loosening becomes essentially zero and eventual disengagement of the mating parts becomes a possibility. Exemplary forms of free running lock type nut fasteners include jam nuts, cotter pins extending through a nut slot aligned with an aperture in the bolt shank; lock wire, lock washers, etc. The top lock form of lock nut is also free running until the top of the nut engages the bolt thread.

By contrast, prevailing torque type lock nut fasteners retain a continuing resistance to removal rotation even after fastener preload is fully dissipated so as to afford re-use suitability. Prevailing torque fasteners are typically of all metal that includes a thread modification of sorts or with an intervening non-metallic element added or fused to the threads. A form of prevailing torque lock nut is disclosed, for example, in U.S. Pat. No. 4,682,924 incorporated herein by reference.

It will be appreciated that such nuts, in whatever format, are typically manufactured in bulk and a factor critical to their marketability is a predictable consistency in their operative features. Not least of such features are the torque levels by which lock nuts in their various sizes are applied for maintaining a required break loose torque. Overtorquing beyond IFI standards has typically caused thread galling of the nut, bolt or both. Attempts at creating a prevailing torque type lock nut for effecting annular engagement with bolt threads have previously proved unsuccessful. Failure has been generally attributed to gross inconsistencies in encountered torque levels both above and below IFI standards that rendered operating performance unpredictable, unreliable and caused chronic galling to be incurred.

OBJECTS OF THE INVENTION

It is therefore an object of the invention to provide a novel prevailing torque type lock-nut fastener affording a substantially uniform 360 degree lock resistance against a bolt thread on which the nut is assembled.

It is a further object of the invention to provide a novel lock-nut of the-previous object that is free starting yet even when mass produced imposes a predictable annular interference friction enabling the nut to be secured at any desired position along the bolt.

It is a still further object of the invention to effect the previous objects with a nut that because of its locking feature can predictably exceed IFI torque standards by substantial amounts without causing gall damage to the threads of either the nut or bolt.

SUMMARY OF THE INVENTION

This invention relates to a novel construction for a free starting, prevailing torque type lock nut fastener. More specifically, the invention relates to a prevailing torque type lock nut affording a predictable annular friction force between the nut and bolt threads such that it can be stopped anywhere in the course of being tightened yet can consistently exceed IFI torque standards without damage to either of the engaging threads.

The foregoing is achieved in accordance with the invention by means of a lock nut of among various metallic compositions that operatively conforms to or exceeds IFI and ANSI/ASME torque standards. They are caused to effect a friction interference locking with an-annular engagement at uniformly predictable torque levels suitable for its end use application. The lock nut hereof is free starting from either end yet because of a controlled compression deformation force applied axially to an otherwise standard nut, a condensed height reduction is achieved causing a uniformly narrowed thread pitch relative to a standard bolt thread on which the nut is to be assembled.

Having been internally deformed, the imposed friction interference of the nut thread engages annularly about the bolt threads, yet for any given nut size and composition the applied torque is predictably uniform for use in the trade. At the same time, the locking resistance forms both a center lock and a top lock that sill vary consistently in accordance with nut size, material composition, thread count, nut pattern, and/or the specific process employed for initial manufacture of the original nut of which the lock nut is formed. As a consequence, and unlike the prior art in which similar purpose nuts incurred erratic performance in torque levels by which extensive thread galling was incurred, the lock nut hereof enjoys a predictable operational performance enabling its ready adaption in the industry.

The above noted features and advantages of the invention as well as other superior aspects thereof, will be further appreciated by those skilled in the art upon reading the detailed description which follows in conjunction with the drawings.

BRIEF DESCRIPTION OF THE DRAWINGS

FIG. 1 is a vertical cross section of a standard fastener nut of the prior art;

FIG. 2 is a vertical cross section like FIG. 1 after modification to comprise the prevailing torque type lock nut of the invention; and FIG. 3 is a schematic elevation illustrating formation of the lock nut of FIG. 2.

DESCRIPTION OF THE PREFERRED EMBODIMENT

In the description which follows, like parts are marked throughout the specification and drawings with the same reference numerals respectively. The drawing figures are not necessarily to scale and in certain views, proportions may have been exaggerated for purposes of clarity.

Referring now to the drawings, there is illustrated in FIG. 1 a sectional view of a conventional hex-nut, designated 10, that is available from a variety of commercial sources. The nut can be anyone among a variety of available standard sizes 12 having a choice of threads 14 of a selected pitch such as a ⅜-16, ½-13, ⅝-11, etc. The composition can typically be of various steels, treated or untreated such as soft steel (1010–1018), medium steel (grade 5), hard steel (grade 8), etc. or can be any of a variety of different metals including alloys such as stainless steel (18 or 8) alloyed steels (nickel, titanium, chrome), brass or aluminum. For any given size, the original nut 10 will be characterized as having a height dimension "A" corresponding to the standard in the industry.

Referring now to FIGS. 2 and 3, the lock nut hereof is designated 16 and is formed in the manner of FIG. 3 by placing nut 10 within an annular cup fixture 17 positioned on a hard surface 18. Semi-annular striker plates 20 and 22 surround cup 17 and are secured to surface 18 by bolts 24.

Coaxially positioned for reciprocal displacement with respect to annular cup 17, is a vertically displaceable ram 26 which when descending can apply a predetermined level of force 28, via its nose 30, against nut 10 whereby compression of the nut is incurred. Compression, in accordance herewith, will cause a height reduction of the nut from the dimension "A" of FIG. 1 by an amount indicated as "X" in FIG. 2. Limiting compression in this arrangement are the ramp surfaces 32 and 34 of the striker plates 20 and 22 respectively that complement the frusto-conical end face 36 of the ram surrounding nose 30.

Dimension "X" is preferably in the range of between about 0.010–0.015 inches such that the pitch of threads 38 in nut 16 are proportionately reduced from that of original threads 14. The level of applied force will vary both with the size and composition of the original hex nut 10 as exemplified by the following table:

| | LBS OF COMPRESSION (PSI) | |
|---|---|---|
| Hex Nut Size | Soft Steel | Hard Steel |
| ⅜ - 16 | 100 | 125 |
| ½ - 13 | 140 | 160 |
| ⅝ - 11 | 170 | 200 |

The foregoing will of course vary for other metallic compositions and/or nut sizes.

By controlling and/or limiting reduction of the nut height to dimension "X", the amount of thread pitch distortion for any size or composition of hex nut becomes uniform and can be readily predicted. Yet because the threads at either end sufficiently resemble the standard thread pitch of a bolt on which the nut is to be applied, the nut remains free starting and reversibly installable. This option lends to automatic feeding from a hopper or the like yet, by virtue of only a minor reduction in thread pitch of nut 16 as compared to the standard pitch of the bolt on which it is to be assembled, relative rotation of either the assembled bolt or nut will cause a 360 degree binding interference engagement between them. Such engagement will prevail and repeatably prevail in a prevailing torque lock type relation therebetween.

When effecting final installation, torque levels at or above the IFI standards can be anticipated such that when installation is completed, extremely high levels of vibration can be absorbed without any adverse loosening between the nut and bolt. In this relation, the nut is characterized by having the virtues of two separate features in a single nut in that it provides both a center lock along with the free starting feature of a top lock. Having a controlled dimensional consistency, the max IFI torque standard can be readily exceeded by as much as plus 80 percent without incurring gall damage to the nut threads, bolt threads, or both.

By the above description there is disclosed a novel prevailing torque type lock nut affording 360 degree annular engagement against an assembled bolt that is highly reliable and predictably dependable for production manufacture and marketing to the trade. It can be provided in a variety of sizes and metallic compositions. The virtues thereof are many in overcoming the limitations incurred by prevailing torque type lock nuts of the prior art in that the purchaser of such lock nuts can achieve a quality installation without concern about potential thread damage of either the nut, the bolt, or loss of break loose torque therebetween.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. A prevailing torque type lock nut for assembly on a bolt with which it is to be utilized comprising:

a nut body;

a bore axially extending through said body; and threads in said bore axially compressed to afford a center lock feature intermediate its ends;

said nut body being of a height compressively condensed of controlled dimension compared to a standard uncompressed nut of like size.

2. A lock nut in accordance with claim 1 in which the compressed threads of said bore have a reduced pitch correlated to the compressive reduction of said body height.

3. A lock nut in accordance with claim 2 in which the threads of said bore are characterized as free starting from either end of said nut body with respect to a bolt of standard thread pitch with which it is to be assembled.

4. A lock nut in accordance with claim 3 in which said compressed nut threads effects a 360 degree break loose engagement resistance against a bolt of standard thread pitch on which it is to be assembled.

5. A lock nut in accordance with claim 4 in which when assembled on a bolt of standard thread pitch, said compressed threads can safely impose a break loose torque resistance exceeding the torque standard of the Industrial Fastener Institute.

6. A lock nut in accordance with claim 5 in which the compression reduction of said height is substantially in the range of between 0.010–0.015 inches.

7. A lock nut in accordance with claim 1 in which said lock nut is of a composition selected from the group consisting of soft steel, medium steel, high carbon steel, stainless steel, alloyed steel, brass and aluminum.

8. A lock nut in accordance with claim 7 in which the torque tension of said lock nut while being assembled is characterized as able to safely exceed the nut tightening torque standard of the Industrial Fastener Institute.

* * * * *